United States Patent [19]

Kim

[11] Patent Number: 5,523,019
[45] Date of Patent: Jun. 4, 1996

[54] DEFOAMER COMPOSITION

[75] Inventor: Samuel H. Kim, Blue Bell, Pa.

[73] Assignee: E. F. Houghton & Company, Valley Forge, Pa.

[21] Appl. No.: 334,610

[22] Filed: Nov. 4, 1994

Related U.S. Application Data

[63] Continuation of Ser. No. 987,650, Dec. 12, 1992, abandoned.

[51] Int. Cl.$^6$ ........................................... B01D 19/04
[52] U.S. Cl. ............................................. 252/358; 252/321
[58] Field of Search ........................................ 252/321, 358

[56] References Cited

U.S. PATENT DOCUMENTS

| | | | |
|---|---|---|---|
| 2,926,116 | 2/1960 | Keim | 162/164.3 |
| 3,058,873 | 10/1962 | Keim et al. | 162/164.3 |
| 3,640,841 | 2/1972 | Winslow et al. | 162/112 |
| 3,705,859 | 12/1972 | Boylan | 252/321 |
| 3,705,860 | 12/1972 | Duvall | 252/358 |
| 3,869,342 | 3/1975 | Munjat et al. | 162/164.3 |
| 3,869,343 | 3/1975 | Munjat et al. | 162/164.3 |
| 3,959,175 | 5/1976 | Smith, Jr. et al. | 252/321 |
| 3,980,605 | 9/1976 | Steigelmann | 428/36.6 |
| 4,063,995 | 12/1977 | Grossman | 162/112 |
| 4,064,213 | 12/1977 | Lazorisak et al. | 162/112 |
| 4,123,383 | 10/1978 | Ihde, Jr. | 252/321 |
| 4,332,695 | 6/1982 | Schulz et al. | 252/312 |
| 4,501,640 | 2/1985 | Soerens | 162/111 |
| 4,514,319 | 4/1985 | Kulkarni et al. | 252/321 |
| 4,528,316 | 7/1985 | Soerens | 524/503 |
| 4,684,439 | 8/1987 | Soerens | 162/112 |
| 4,788,243 | 11/1988 | Soerens | 524/503 |
| 4,795,530 | 1/1989 | Soerens et al. | 162/112 |
| 4,883,564 | 11/1989 | Chen et al. | 162/112 |
| 4,994,146 | 2/1991 | Soerens | 162/112 |
| 5,071,591 | 12/1991 | Sheridan | 252/358 |
| 5,082,590 | 1/1992 | Araud | 252/321 |
| 5,096,617 | 3/1992 | Ball et al. | 252/358 |
| 5,152,925 | 10/1992 | Furman | 252/321 |
| 5,229,033 | 7/1993 | Nguyen et al. | 252/358 |

FOREIGN PATENT DOCUMENTS 979579  12/1975  Canada.

OTHER PUBLICATIONS

*Hawley's Condensed Chemical Dictionary, 11th Edition,* (van Nostrand Reinhold Company, 1987) p. 391

*Primary Examiner*—Richard D. Lovering
*Assistant Examiner*—Daniel S. Metzmaier
*Attorney, Agent, or Firm*—Howson and Howson

[57] ABSTRACT

A defoamer composition useful in pulp and paper processes is disclosed which contains a hydrocarbon in a stable liquid state characterized by having no or minimal chemical reactive groups, and which is preferably a polyalphaolefin, as carrier fluid and a high density polymer as a defoaming agent. This composition excludes petroleum oil and ethylene-bis-stearamide.

12 Claims, No Drawings

DEFOAMER COMPOSITION

This is a continuation of application Ser. No. 07/987,650, filed Dec. 12, 1992, now abandoned.

FIELD OF THE INVENTION

This invention relates to a composition used in pulp and paper mill operations for inhibiting the formation of foam or suppressing existing foam, and more particularly to a defoamer composition which does not include petroleum oils or ethylene-bis-stearamide.

BACKGROUND OF THE INVENTION

Defoamers are compositions used in the pulp and paper mill industry for the control of foam in various processes. For instance, a defoamer is useful in Kraft pulp stock, sulfite stock, screen room, bleach plant area and the like.

Prior art defoamer compositions are generally composed of a carrier fluid, a defoaming agent and miscellaneous additives. The most cost effective carrier fluids of the prior art have been the petroleum oils (mineral oils) because of their low cost and abundance. Water has been favored also as an extender of the anhydrous defoamers, when necessary to lower the product cost. Various defoaming compositions have been documented in product literature and patents. See, e.g., U.S. Pat. Nos. 5,082,590; 5,096,617 and 5,071,591.

An example of a conventional defoamer is called Brown Stock Wash (BSW) Defoamer. The key components for BSW defoamer compositions are mineral oil (petroleum oil), hydrophobic silica, ethylene-bis-stearamide (EBS) and silicone oil. In all publications and commercial formulas of the BSW defoamers, EBS has been one of the essential components, because it is the most cost effective defoaming agent known to the pulp and paper industries. Various mixtures of the above ingredients have been in use along with some special additives in current commercial defoamers, which are economically successful.

Pulp and paper industries have been troubled in the past several years by potential discharge of undesirable by-products, such as the carcinogenic dioxins, from their chemical (bleaching) process. The petroleum oils used in defoamers have been confirmed to contain dioxin precursors (dibenzodioxin and dibenzofuran) which are converted to dioxins during the bleaching process in the mills. Thus, all defoamer suppliers have been working on suitable replacements for the petroleum oils because of worldwide concern about the health hazards and environmental problems linked to the petroleum oils. The mineral oils are no longer favored by many responsible pulp and paper mills.

Another major problem facing pulp and paper mills has been the EBS. The EBS-containing defoamers have been the most cost effective products for the past 30 or more years. The EBS has been the champion component for the pulp defoamer development and far superior even to silicone oil on a cost basis. However, the EBS in the pulp and paper mill processes has the detrimental side effect of producing unwanted deposits. The hardest deposit is caused by the EBS, which has a high melting point and low solubility. All pulp and papers mills, along with defoamer suppliers, have been searching for an EBS replacement which will not sacrifice defoamer performance. See, e.g., the defoamer composition described in U.S. Pat. No. 5,152,925.

Present pulp and paper mills depend even today upon the EBS and petroleum components in many formulations. These two components are the necessary evils that the pulp and paper mills have often been forced to use because of their cost effectiveness.

There remains a need in the paper and pulp processing industries for cost effective and functional defoamer compositions which do not have the disadvantages caused by the presence of petroleum and EBS.

SUMMARY OF THE INVENTION

In one aspect, the present invention provides a novel defoamer composition which contains a hydrocarbon in a stable liquid state which is characterized by having no or only a minimal number of chemical reactive groups as the carrier fluid. This hydrocarbon is used to replace petroleum oil in certain defoamer compositions. Currently, the preferred hydrocarbons are alphaolefins, preferably a polyalphaolefin.

In another aspect, the invention provides a novel defoaming composition which contains as a replacement for EBS, a high density polyethylene polymer, as well as a hydrocarbon as defined above as a carrier. Preferably, this carrier is an alphaolefin.

In a further aspect, a method is disclosed for reducing foam in pulp and paper processes by adding a composition of this invention to a suitable wash liquid.

DETAILED DESCRIPTION OF THE INVENTION

The present invention provides novel defoamer compositions which overcome several problems inherent in the use of prior art defoamers by replacing both the petroleum oil carrier and EBS with components which avoid the production of dioxins and unwanted deposits.

In a defoaming composition of this invention, the carrier fluid is synthetic and comprises a hydrocarbon in a stable liquid state. The hydrocarbon selected for this use is further characterized by having no chemical reactive groups on its carbon chain. The hydrocarbon selected for this use can be characterized by having only a minimal number of reactive groups on the carbon chain. By minimal number of reactive groups is meant the smallest number of reactive groups per carbon chain length which can be present without causing unwanted reactions in the defoamer. This minimal number is dependent on the length of the carbon chain and can be readily determined by one of skill in the art.

An example of a hydrocarbon meeting the requirements of the carrier for the defoamer composition is an alphaolefin. Alphaolefins are unsaturated hydrocarbons of the formula $C_nH_{2n}$, containing a substituted atom or radical attached to the same atom as the principal group. Preferably, polyalphaolefins (PAOs), which are compounds formed by repeated $C_nH_{2n}$ units, are desirable synthetic carriers. PAOs are a superior replacement for petroleum oils as defoamer composition carriers. New illustrative defoamer compositions based on a PAO carrier display excellent performance, maintaining good physical properties.

Exemplary hydrocarbon carriers, both alphaolefins and PAOs, useful in a defoaming composition of the present invention include, without limitation, 1-hexene, 1-octene, 1-decene, 1-tetradecene, 1-heptene, 1-hexadecene, 1-octadecene, 1-nonene, 1-undecene, 1-tridecene, 1-pentadecene, 1-heptadecene, 1-nonadecene, isoparaffinic polyalphaolefin, polyalphaolefin polymers, and liquid polyethylene. Alphaolefins and polyalphaolefins are commercially available products from sources including Chevron and Henkel.

Other hydrocarbons in stable liquid state characterized by no or a minimal number of chemical reactive groups which are useful as synthetic carrier fluids include polybutene and polyisobutylene. It has been surprisingly determined that another synthetic carrier fluid which is useful in the present invention, although it is not within the above-defined class of hydrocarbons, is a polydimethylsiloxane. However, this compound is not the most practical because of its high cost.

Water can be used as an extender or diluent for the above-described primary carrier fluids. Alternatively, water can be used as a secondary carrier fluid for water-extended defoamers of the inventions described here. When used, water may make up between 0 to about 95% of the defoamer composition. When the primary carrier fluid is water dispersable, water is generally used in an amount of about 85% of the composition. Water dispersability of the above-identified hydrocarbons can be readily determined by one of skill in the art with resort to conventional and simple techniques. Preferably, however, when used as a secondary carrier, water is between about 30 to about 40% of the defoamer.

Certain defoamer compositions of this invention also differ from prior art defoamers in that they also contain no EBS. High density polymers are employed in place of EBS in defoamers of this invention. By the term "high density" is meant an essentially linear polymer, i.e. lacking branches. Illustrative high density polymers useful in this invention include, without limitation, oxidized ethylene homopolymers, polypropylene homopolymers, ethylene homopolymers, polyethylene polymers and microcrystalline waxes formed of these components. The polyethylene polymers are generally water-insoluble, but are desirable, as they can be made into water-dispersible forms with suitable surfactants. Polyethylenes and other high density polymers are commercially available from sources including Petrolite Corporation and Astor Wax Corporation.

Defoamers of the present invention also optionally incorporate conventional defoaming composition additives, as well as the above-mentioned synthetic carrier fluid and high density polymers, thereby creating new defoamers that can compete effectively against the conventional EBS and mineral oil based defoamers. Among such additives are hydrophobic silica, silicone oil, waxes, fatty alcohols, fatty acids, and ethoxylated fatty acids, such as, polypropylene glycol, polyether modified polysiloxane, polyethylene glycol oleate, polyoxypropylene-polyoxyethylene copolymer, and diethylenetriamine.

The defoamer compositions may further contain one or more surfactant compounds (non-ionic, anionic or cationic) to improve the efficiency of the defoamer compositions. Examples of suitable surfactants include those derived from polyethylene glycol, polypropylene glycol, polypropylene triol, butoxy polypropylene polyethylene glycol, dimethylpolysiloxane, alkoxylated dimethylpolysiloxane, and the like. Suitable surfactants are well known to those of skill in the art. See, for example, *McCutcheon's Emulsifiers and Detergents* (1992).

Depending upon the final product forms (anhydrous or water-based), such additives and surfactants are capable of enhancing the physical properties and performance of the final defoamer products, including product viscosity control for easy handling, defoamer efficiency enhancer, product stability and the like. Such additives are known to those of skill in the art. The surfactants and other additive materials, if present, will normally represent less than about 25 percent by weight of the total defoamer composition. However, it is possible that certain additives can exceed that percentage.

One of skill in the art may determine the specific surfactants and other additive materials to be used for a particular application by application of routine techniques.

In defoamer compositions of the present invention, the preferred ranges of the individual components, expressed in percentages of the total defoamer composition, by weight, are provided below. While certain additives are identified by name for simplicity, it is understood that other additives could be added in place of the listed additives. Generally, when present in the composition, the hydrocarbon carrier, e.g., a polyalphaolefin, is present from about 5% to about 98 wt. % of the defoamer composition. The high density polyethylene polymer, e.g., a polyethylene, is present in the compositions from about 0.1 to about 50 wt. % of the composition. Water is optionally present in an amount of between 0 to 95% by weight. An additive, silica, is present in an amount from about 0.1% to about 25 wt. % of the composition, and silicone oil is from about 0.1% to about 98 wt. % of the composition.

To form defoamer compositions of the present invention, the selected carrier, e.g., a polyalphaolefin or a 1-octadecene, in a stable liquid form is mixed with the selected high density polymer, e.g., polyethylene, which is normally in solid form. In general, polyethylene, and additives, such as hydrophobic silica and silicone oil, are mixed in some portion of the carrier fluid and heated in a first tank to the melting point of selected polyethylene. The rest of the ingredients are mixed in a separate second tank. The above hot liquid in the first tank is quenched into the second tank. The resulting mixture is then passed through a homogenizer to further break the quenched particles into finer particles. The individual steps of this process and the apparatus used are within the skill of, and available to, one skilled in this art upon a review of this disclosure.

The novel defoamer compositions of this invention are characterized by the desired properties of excellent defoaming stamina, freedom from dioxin precursors, and reduction or elimination of deposit problem which was caused by the EBS deposit. Among the other excellent physical properties, an added benefit of the defoamers described herein is good fluidity of product for the end use in pulp and paper mills.

Defoamer compositions of this invention are useful in controlling foam, i.e. inhibiting foam formation and destroying existing foam, in a variety of pulp and paper mill operations. Generally, the defoamers of this invention will find primary use in treating foams that could previously not be treated with EBS-containing defoamers due to the deposit build-up problems referred to above. The defoamer compositions are especially useful for controlling foam which occurs in BSW operations. Furthermore, they should find use wherever dilute black liquors are found in a paper mill. They may be used in controlling foam in screen rooms, on paper machines, in paper coatings, and to treat the plant effluent which is going to a waste treatment facility. The defoamer composition of this invention may be added to the paper or pulp processing system neat, or it may be further diluted with additional organic liquids, though there is generally no necessity to do so. Defoamer compositions that are water-insoluble may be used by direct addition into the brown stock vats or by injection into shower headers or vat dilution lines.

The quantity of the defoamer compositions required to control foam will vary depending upon the specific nature of the foam to be treated and upon the individual components used to prepare the defoamers. Generally, however, a quantity of defoamer from about 0.1 to about 2.0 pounds per ton of pulp will be suitable, and preferably about 0.5 to about 1.0 pound per ton of pulp.

The following examples illustrate compositions of the invention and their performance as compared with conventional defoamer compositions. These examples are illustrative only and are not meant to limit the scope of this invention.

EXAMPLE 1

Preparation of Defoamer Compositions

Defoamer compositions of the present invention were prepared as follows. Parts are by weight unless otherwise indicated.

A. Composition No. 1

One part of polypropylene glycol [BASF] and 0.7 parts of polyether modified polysiloxane [Rhone Poulenc, Inc.] were charged to a beaker containing 73.8 parts of 1-hexadecene [Chevron Chemical] and 3 parts of hydrophobic silica [Coated Product Technologies] at room temperature (77° F.). Into a second beaker were added 15 parts of 1-hexadecene, 2.5 parts of polydimethyl siloxane [VanWaters & Rogers] and 4 parts of polyethylene wax [Petrolite Corporation]. The mixture in the second beaker was heated to 270° F. until it was liquified. The contents of the first and second beakers were passed through a homogenizer to achieve a uniform suspension.

B. Composition No. 2

Fifteen parts of polyalphaolefin polymer, 0.05 parts of diethylenetriamine, 0.53 parts of polydimethylsiloxanediol and 3 parts of silica were charged at room temperature (77° F.) to a beaker. The contents of this beaker were heated for 3 hours at 300° F. Toward the end of heating, 3 parts of polyethylene wax were added to the beaker. In a second beaker were charged 77.19 parts of polyalphaolefin polymer, 0.5 parts of polydimethylsiloxane, 0.2 parts of polyethylene glycol oleate and 0.53 parts of polyoxypropylane-polyoxyethylene copolymer at room temperature (77° F.). The first beaker's contents were poured into the second beaker, cooling the beaker, if necessary. The final batch was passed through a homogenizer to obtain a uniform suspension.

C. Composition No. 3

One part of polypropylene glycol and 0.7 parts of polyether modified polysiloxane were charged to a beaker containing 73.8 parts of 1-octadecene [Chevron Chemical] and 3 parts of hydrophobic silica at room temperature (77° F.). Into a second beaker were added 15 parts of 1-hexadecene, 2.5 parts of polydimethyl siloxane and 4 parts of polyethylene wax. The mixture in the second beaker was heated to 270° F. until it was liquified. The contents of the first and second beakers were passed through a homogenizer to achieve a uniform suspension.

D. Composition No. 4

One part of polypropylene glycol and 0.7 parts of polyether modified polysiloxane were charged to a beaker containing 73.8 parts of isoparaffinic polyalphaolefin [Chevron Chemical] and 3 parts of hydrophobic silica at room temperature (77° F.). Into a second beaker were added 15 parts of 1-hexadecene, 2.5 parts of polydimethylsiloxane and 4 parts of polyethylene wax. The mixture in the second beaker was heated to 270° F. until it was liquified. The contents of the first and second beakers were passed through a homogenizer to achieve a uniform suspension.

E. Composition No. 5

Fifteen parts of polyalphaolefin polymer, 0.05 parts of diethylenetriamine, 1.0 part of polydimethylsiloxanediol and 6 parts of silica were charged at room temperature (77° F.) to a beaker. The contents of this beaker were heated for 3 hours at 300° F. Toward the end of heating, 3 parts of polyethylene wax were added to the beaker. In a second beaker were charged 71.95 parts of polyalphaolefin polymer, 1.5 parts of polydimethylsiloxane, 0.5 parts of polyether modified polysiloxane and 1.0 part of polypropylene glycol at room temperature (77° F.). The first beaker's contents were poured into the second beaker, cooling the beaker, if necessary. The final batch was passed through a homogenizer to obtain a uniform suspension.

F. Composition No. 6

Fifteen parts of polyalphaolefin, 0.05 parts of diethylenetriamine, 0.5 parts of polydimethylsiloxanediol and 2 parts of silica were charged at room temperature (77° F.) to a beaker. The contents of this beaker were heated for 3 hours at 300° F. Toward the end of heating, 3 parts of EBS were added to the beaker. In a second beaker were charged 76.95 parts of polyalphaolefin, 1.0 part of polydimethylsiloxane, 0.5 parts of polyether modified polysiloxane and 1.0 part of polypropylene glycol at room temperature (77° F.). The first beaker's contents were poured into the second beaker, cooling the beaker, if necessary. The final batch was passed through a homogenizer to obtain a uniform suspension.

EXAMPLE 2

Evaluation of Defoaming Compositions

Defoamer compositions of Example 1 were evaluated and compared to prior art compositions for their effective defoaming activity on synthetic Kraft pulp stock as follows. The object of the testing procedure was to determine the length of time it took for the foam in the testing stock to which defoamer was added to reach 20.0 mm in height. The longer the time it took for the foam to reach that height, the more effective the defoamer composition.

The testing procedure was performed as follows:

1,200 mls of standard Kraft pulp testing stock (black liquor) [St. Joe Forest Products] and a measured quantity of defoaming agent were added to a calibrated tube, to which a showed head was attached to create an aeration effect, as the black liquor passed through the shower head. The amount of foam created or reduced was measured every 15 seconds until the foam overflowed the top of the calibrated tube. The height of foam was read and recorded for comparison.

The results of the tests are reported in Tables 1 and 2 below in which the appropriate defoamer compositions Nos. 3 through 6 from Example 1 were compared against commercial defoamers designated as Control A or B, sold as defoaming agents for such a stock.

In Table 1, Control A, a typical BSW [Control A; E. F. Houghton, Product 81-41] defoamer based on EBS and conventional components in mineral oil, was compared with composition 6 of this invention. It is desirable for the run to last as long as possible before the foam reaches a level of 20.0 mm. As can be seen in this table, with no defoamer present, the foam reaches a height of 20.0 mm in 45 seconds. With Control A defoamer, the foam reaches this height in 499 seconds; and with the defoamer of Example 6, the foam reaches 20.0 mm in 536 mm.

Composition 6, a defoamer of the present invention, not only outperformed Control A, a petroleum oil containing defoamer, but also has the previously mentioned advantages of avoiding dioxin formation. Thus Composition 6 exhibits a superior contribution as a defoamer.

TABLE 1

Foam Height (mm)

| Time Sec. | Blank 0 | Control A (0.30 cc) | Composition 6 (0.30 cc) |
|---|---|---|---|
| 0 | 11.0 | 20.0 | 20.0 |
| 15 | 17.5 | 19.5 | 18.5 |
| 30 | 18.5 | 19.4 | 17.0 |
| 45 | 20.0 | 19.4 | 15.0 |
| 60 | | 19.0 | 14.0 |
| 75 | | 18.5 | 13.0 |
| 90 | | 18.0 | 12.8 |
| 105 | | 18.0 | 12.5 |
| 120 | | 17.5 | 12.6 |
| 135 | | 17.4 | 12.8 |
| 150 | | 17.4 | 13.0 |
| 165 | | 17.4 | 13.0 |
| 180 | | 17.0 | 13.2 |
| 195 | | 17.0 | 13.4 |
| 210 | | 17.0 | 13.6 |
| 225 | | 17.2 | 13.9 |
| 240 | | 17.5 | 14.0 |
| 255 | | 17.5 | 14.4 |
| 270 | | 17.9 | 14.9 |
| 285 | | 18.0 | 15.2 |
| 300 | | 18.0 | 15.5 |
| 315 | | 18.2 | 16.0 |
| 330 | | 18.4 | 16.2 |
| 345 | | 18.5 | 16.8 |
| 360 | | 18.8 | 17.0 |
| 375 | | 18.9 | 17.2 |
| 390 | | 19.0 | 17.6 |
| 405 | | 19.2 | 17.9 |
| 420 | | 19.4 | 18.0 |
| End @ | | 20.0 499 sec. | 20.0 536 sec. |

In Table 2, Control B, a commercial BSW defoamer [Colloids BSW Defoamer of Rhone Poulenc, Inc.] based on non-EBS and petroleum oil, was compared with defoamer compositions 3, 4 and 5 of Example 1. The performances of defoamer compositions 3 and 4 are equivalent to that of the commercially available Control B; however, the defoamers of the present invention have the advantage of no dioxin production due to the absence of petroleum oil. Composition 5 of the present invention demonstrates superior performance in the foam height test to that of the Control B, i.e, 600 seconds for the maximal foam height vs. 360 seconds for the Control B, in addition to its other advantages.

TABLE 2

Foam Height (mm)

| Time Sec. | Blank | Control B (0.25 cc) | Comp. 3 (0.25 cc) | Comp. 4 (0.25 cc) | Comp. 5 (0.25 cc) |
|---|---|---|---|---|---|
| 0 | 11 | 20.0 | 20.0 | 20.0 | 20.0 |
| 15 | 17.5 | 17.2 | 19.9 | 17.8 | 20.0 |
| 30 | 19.0 | 14.5 | 18.0 | 14.0 | 19.2 |
| 45 | 20.0 | 12.0 | 15.0 | 12.0 | 18.0 |
| 60 | | 11.2 | 12.9 | 12.2 | 16.5 |
| 75 | | 11.2 | 12.8 | 12.9 | 15.1 |
| 90 | | 11.4 | 13.2 | 13.2 | 13.8 |
| 105 | | 11.8 | 13.5 | 13.2 | 12.2 |
| 120 | | 11.9 | 13.8 | 13.8 | 11.8 |
| 135 | | 12.2 | 14.0 | 14.0 | 11.8 |
| 150 | | 12.5 | 14.0 | 14.4 | 11.9 |
| 165 | | 13.0 | 14.8 | 14.9 | 12.0 |
| 180 | | 13.5 | 15.2 | 15.2 | 12.0 |
| 195 | | 14.0 | 16.0 | 16.0 | 12.0 |
| 210 | | 14.8 | 16.5 | 16.2 | 12.0 |
| 225 | | 15.5 | 17.0 | 16.9 | 12.1 |
| 240 | | 16.4 | 17.2 | 17.2 | 12.1 |
| 255 | | 16.9 | 17.8 | 17.8 | 12.1 |
| 270 | | 17.2 | 18.0 | 18.2 | 12.1 |
| 285 | | 18.0 | 18.5 | 18.5 | 12.1 |
| 300 | | 18.4 | 19.0 | 19.0 | 12.2 |
| 315 | | 19.0 | 19.5 | 19.2 | 12.5 |
| 330 | | 19.4 | 20.0 | 19.8 | 12.8 |
| 345 | | 19.9 | | 20.0 | 12.8 |
| 360 | | 20.1 | | | 12.9 |
| 375 | | | | | 13.0 |
| 390 | | | | | 13.0 |
| 405 | | | | | 13.1 |
| 420 | | | | | 13.4 |
| End @ | | | | | 17.1 600 sec. |

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A defoamer composition capable of inhibiting or suppressing foam formation, consisting essentially of:

(a) a liquid polyalphaolefin carrier fluid formed by repeating units of an alphaolefin, wherein said alphaolefin is selected from the group consisting of 1-hexene, 1-heptene, 1-octene, 1-nonene, 1-decene, 1-undecene, 1-tridecene, 1-tetradecene, 1-pentadecene, 1-hexadecene, 1-octadecene, 1-heptadecene, and 1-nonadecene;

(b) a high density polymer selected from the group consisting of oxidized ethylene homopolymers, polyethylene homopolymers, and polypropylene homopolymers;

(c) an additive selected from the group consisting of hydrophobic silica, silicone oil, polypropylene glycol, and diethylenetriamine;

(d) a non-ionic surfactant compound selected from the group consisting of polyether modified polysiloxane, polyethylene glycol oleate, and polyoxypropylene-polyoxyethylene copolymer; and (e) water in an amount of between 1 to about 95 weight percent of said composition, wherein said composition lacks petroleum oils and ethylene-bis-stearamide.

2. The composition according to claim 1 wherein said carrier fluid is from about 5 to about 98 weight percent of said defoamer composition.

3. The composition according to claim 1 wherein the high density polymer is from about 0.1 to about 50 weight percent of the composition.

4. The composition according to claim 1 wherein said additive is silica, said silica being from about 0.1 to about 25 weight percent of said composition.

5. The composition according to claim 1 wherein said additive is silicone oil, said silicone oil being from about 0.1 to about 98 weight percent of said composition.

6. The composition according to claim 1, wherein said composition contains about 30 to about 40 weight percent of water.

7. The defoamer composition according to claim 1, wherein the additive is silica, said silica between about 0.1 to about 25 weight percent of the composition, and the high density polymer is about 0.1 to about 50 weight percent of the composition.

8. The defoamer composition according to claim 1 consisting essentially of: one part by weight of polypropylene glycol; 0.7 parts by weight of polyether modified polysiloxane; 88.8 parts by weight of 1-hexadecene; 3 parts by weight of hydrophobic silica; 2.5 parts by weight of polydimethyl siloxane and 4 parts by weight of polyethylene wax.

9. The defoamer composition according to claim 1 consisting essentially of 92.19 parts by weight of polyalphaolefin polymer; 0.05 parts by weight of diethylenetriamine; 0.53 parts by weight of polydimethylsiloxanediol; 3 parts by weight of silica; 3 parts by weight polyethylene wax; 0.5 parts by weight of polydimethylsiloxane, 0.2 parts by weight of polyethylene glycol oleate and 0.53 parts by weight of polyoxypropylene-polyoxyethylene copolymer.

10. The defoamer composition according to claim 1 consisting essentially of one part by weight of polypropylene glycol; 0.7 parts by weight of polyether modified polysiloxane; 88.8 parts by weight of 1-octadecene; 3 parts by weight of hydrophobic silica; 2.5 parts by weight of polydimethyl siloxane and 4 parts by weight of polyethylene wax.

11. The defoamer composition according to claim 1 consisting essentially of one part by weight of polypropylene glycol; 0.7 parts by weight of polyether modified polysiloxane; 88.8 parts by weight of isoparaffinic polyalphaolefin; 3 parts by weight of hydrophobic silica; 2.5 parts by weight of polydimethyl siloxane and 4 parts by weight of polyethylene wax.

12. The defoamer composition according to claim 1 consisting essentially of 86.95 parts by weight of polyalphaolefin; 0.5 parts by weight of polyether modified polysiloxane; 1.0 parts by weight of polypropylene glycol; 1.5 parts by weight of polydimethyl siloxane; 1.0 parts by weight of polysiloxanediol; 6 parts by weight of silica; and 0.05 parts by weight of diethylenetriamine.

* * * * *